(12) United States Patent
Baez

(10) Patent No.: US 7,669,361 B2
(45) Date of Patent: Mar. 2, 2010

(54) MANUALLY ADJUSTABLE OUTRIGGER

(75) Inventor: Laudelino Baez, Miami, FL (US)

(73) Assignee: Tigress Specialty Metal Products Manufacturing, Inc., Fort Lauderdale, FL (US)

( * ) Notice: Subject to any disclaimer, the term of this patent is extended or adjusted under 35 U.S.C. 154(b) by 279 days.

(21) Appl. No.: 11/600,320

(22) Filed: Nov. 16, 2006

(65) Prior Publication Data

US 2007/0220800 A1 Sep. 27, 2007

Related U.S. Application Data

(60) Provisional application No. 60/736,857, filed on Nov. 16, 2005.

(51) Int. Cl.
*A01K 97/10* (2006.01)
(52) U.S. Cl. .................. 43/27.4; 43/21.2; 114/255; 248/515; 248/514
(58) Field of Classification Search ............ 43/21.2, 43/27.4, 43.13; 114/255; 248/514, 515
See application file for complete search history.

(56) References Cited

U.S. PATENT DOCUMENTS

| 952,812 | A | * | 3/1910 | Jorgensen | 43/21.2 |
|---|---|---|---|---|---|
| 2,233,222 | A | * | 2/1941 | Paton | 52/110 |
| 2,360,402 | A | * | 10/1944 | Determan | 43/21.2 |
| 2,506,824 | A | * | 5/1950 | Brown et al. | 248/515 |
| 2,540,584 | A | * | 2/1951 | Jaycox | 248/515 |
| 2,580,130 | A | * | 12/1951 | Rowdon | 43/21.2 |
| 2,727,707 | A | * | 12/1955 | Wells | 43/21.2 |
| 2,884,213 | A | * | 4/1959 | Hiering | 248/515 |
| 2,886,268 | A | * | 5/1959 | Ahrens, Jr. | 248/515 |
| 2,927,754 | A | * | 3/1960 | Davis | 248/514 |
| 2,958,491 | A | * | 11/1960 | Ackley | 248/514 |
| 3,008,259 | A | * | 11/1961 | Zornes | 43/43.12 |
| 3,014,679 | A | * | 12/1961 | Jepson | 43/15 |

(Continued)

FOREIGN PATENT DOCUMENTS

GB 2 181 932 A 5/1987

(Continued)

OTHER PUBLICATIONS

"Walker Tournament Electric Downrigger"—Basspro.com http://cgi.ebay.com/ws/eBayISAPI.d11?ViewItem&item=7168037851&category=36151 Two pages printed from the Internet on Jul. 28, 2005.

(Continued)

*Primary Examiner*—Darren W Ark
(74) *Attorney, Agent, or Firm*—GrayRobinson, P.A.

(57) ABSTRACT

An adjustable outrigger moves a trolling pole on a fishing vessel to an elevated, outboard position for trolling and inboard to a lowered position when not in use. The outrigger of a preferred embodiment is operated using an operating handle. Rotating the operating handle in one direction rotates a pole held by the outrigger from an inboard position to the outboard, deployed position. Simultaneously with the rotation in the horizontal plane, the pole is elevated in the vertical plane from a near horizontal position to a suitable trolling angle. The operating handle turns a shaft that communicates the rotation of the handle to an internal drive mechanism, which is housed in a drive mechanism housing. The rotational motion is converted to a linear, vertical action using a ball gear mechanism. A track provided by a bayonet coupler converts the linear vertical motion into a combined vertical and rotational motion.

120 Claims, 9 Drawing Sheets

U.S. PATENT DOCUMENTS

| | | | | | |
|---|---|---|---|---|---|
| 3,063,668 | A | * | 11/1962 | Yohe | 43/21.2 |
| 3,161,390 | A | * | 12/1964 | Larson | 43/21.2 |
| 3,190,594 | A | * | 6/1965 | Chion | 43/21.2 |
| 3,212,740 | A | * | 10/1965 | Greenberg | 248/514 |
| 3,304,035 | A | | 2/1967 | Davis | |
| 3,304,036 | A | | 2/1967 | Davis | |
| 3,516,190 | A | * | 6/1970 | Cook | 43/21.2 |
| 3,570,793 | A | | 3/1971 | Schackel | |
| 3,708,141 | A | | 1/1973 | Friedgen et al. | |
| 3,724,791 | A | * | 4/1973 | Mason | 248/515 |
| 3,961,437 | A | | 6/1976 | Lewis | |
| 4,017,998 | A | | 4/1977 | Dumler | |
| 4,063,704 | A | | 12/1977 | Rother | |
| 4,142,315 | A | | 3/1979 | Hoffman | |
| 4,156,320 | A | * | 5/1979 | Kammeraad | 43/27.4 |
| 4,279,553 | A | | 7/1981 | Cleary | |
| 4,528,768 | A | | 7/1985 | Anderson | |
| 4,807,386 | A | * | 2/1989 | Emory, Jr. | 43/27.4 |
| 4,813,171 | A | * | 3/1989 | Cooper et al. | 43/27.4 |
| 4,869,195 | A | | 9/1989 | Eichfeld | |
| 4,875,428 | A | * | 10/1989 | Schlesch et al. | 43/21.2 |
| 4,948,083 | A | * | 8/1990 | McNaney et al. | 43/21.2 |
| 4,993,346 | A | * | 2/1991 | Rupp | 43/21.2 |
| 5,054,737 | A | * | 10/1991 | DeLancey | 43/21.2 |
| 5,140,928 | A | * | 8/1992 | Frick | 43/27.4 |
| 5,243,927 | A | * | 9/1993 | Messick | 43/27.4 |
| 5,245,780 | A | * | 9/1993 | Hansen et al. | 43/27.4 |
| 5,247,759 | A | | 9/1993 | Noriega | |
| 5,438,789 | A | * | 8/1995 | Emory | 43/21.2 |
| 5,445,102 | A | * | 8/1995 | Rupp | 43/27.4 |
| 5,592,893 | A | * | 1/1997 | Jordan et al. | 114/255 |
| 5,685,107 | A | | 11/1997 | Sweet | |
| 5,738,035 | A | * | 4/1998 | Rupp, II | 43/21.2 |
| 5,761,844 | A | * | 6/1998 | Horschel | 43/21.2 |
| 5,921,014 | A | * | 7/1999 | Lee | 43/21.2 |
| 5,921,196 | A | * | 7/1999 | Slatter | 43/27.4 |
| 6,045,109 | A | * | 4/2000 | Mashburn et al. | 43/27.4 |
| 6,052,937 | A | * | 4/2000 | Morong | 43/21.2 |
| 6,053,122 | A | * | 4/2000 | Jordan, III | 43/21.2 |
| 6,237,821 | B1 | | 5/2001 | Owen | |
| 6,269,584 | B1 | | 8/2001 | Peascheck | |
| 6,311,705 | B1 | * | 11/2001 | Ma | 248/514 |
| 6,408,779 | B1 | * | 6/2002 | Roy | 114/255 |
| 6,446,650 | B1 | * | 9/2002 | Ma | 248/514 |
| 6,505,431 | B1 | * | 1/2003 | Christian et al. | 43/21.2 |
| 6,533,237 | B1 | | 3/2003 | Matusek | |
| 6,568,643 | B2 | | 5/2003 | Black | |
| 6,575,182 | B2 | * | 6/2003 | Tung | 248/514 |
| 6,622,741 | B2 | * | 9/2003 | Lai | 248/514 |
| 6,637,146 | B2 | * | 10/2003 | Ernst | 43/21.2 |
| 6,668,745 | B2 | * | 12/2003 | Slatter | 114/255 |
| 6,678,990 | B2 | * | 1/2004 | Cox | 114/255 |
| 6,684,558 | B1 | * | 2/2004 | Gillespie | 43/27.4 |
| 6,729,065 | B2 | * | 5/2004 | Cooper | 43/27.4 |
| 6,766,757 | B1 | * | 7/2004 | Tilley | 43/21.2 |
| 6,769,377 | B2 | * | 8/2004 | Rupp, II | 43/21.2 |
| 6,941,694 | B2 | * | 9/2005 | Ernst | 43/21.2 |
| 6,978,570 | B1 | * | 12/2005 | Clark et al. | 43/27.4 |
| 7,007,906 | B2 | * | 3/2006 | Slatter | 43/21.2 |
| 7,114,283 | B2 | * | 10/2006 | Slatter et al. | 43/27.4 |
| 7,197,845 | B2 | * | 4/2007 | Wilcox et al. | 43/21.2 |
| 7,296,377 | B2 | * | 11/2007 | Wilcox et al. | 43/27.4 |
| 2003/0005616 | A1 | * | 1/2003 | Slatter | 43/27.4 |
| 2003/0167674 | A1 | * | 9/2003 | Cooper | 43/27.4 |
| 2004/0181992 | A1 | | 9/2004 | van Weenen | |
| 2004/0244268 | A1 | * | 12/2004 | Slatter et al. | 43/27.4 |
| 2007/0119089 | A1 | * | 5/2007 | Nicholson | 43/27.4 |
| 2007/0157863 | A1 | * | 7/2007 | Wilcox et al. | 114/255 |
| 2007/0214706 | A1 | * | 9/2007 | Donato | 43/21.2 |
| 2008/0053361 | A1 | * | 3/2008 | Nicholson | 248/514 |
| 2008/0134565 | A1 | * | 6/2008 | Sutherland et al. | 43/21.2 |
| 2008/0155881 | A1 | * | 7/2008 | Carnevali | 43/21.2 |

FOREIGN PATENT DOCUMENTS

| | | |
|---|---|---|
| JP | 5292860 A | 9/1993 |
| JP | 7-67502 | 3/1995 |
| JP | 9168358 A | 6/1997 |
| JP | 2002176895 A | 6/2002 |
| JP | 2003-125688 | 5/2003 |
| WO | 98/53675 A1 | 12/1998 |

OTHER PUBLICATIONS

"Tigress Adjustable Outrigger Holder—Clamp-On" Basspro.com http:www.basspro.com/servlet/catalog.TextID?hvarTarget=search &hvarTextId=58839&hvarAID=froogle&cm_ven=Performics &cm_cat-Searc... Two pages printed from the Internet on Jul. 28, 2005.

"TACO Grand Slam Adjustable Top Mounts", Star Marine Depot Two pages printed from the Internet. Copyright 2004 Star Marine Depot, Inc.

TACO Grand Slam Fixed Top Mount:, Star Marine Depot Two pages printed from the Internet. Copyright 2004 Star Marine Depot, Inc.

* cited by examiner

MANUALLY ADJUSTABLE OUTRIGGER

CROSS-REFERENCE TO RELATED APPLICATION

This application claims the benefit of U.S. Provisional Patent Application Ser. No. 60/736,857, filed Nov. 16, 2005.

FIELD OF THE INVENTION

The present invention relates to fishing equipment in general, and in particular to an adjustable outrigger for extending trolling lines outboard of a boat.

DESCRIPTION OF THE RELATED ART

Trolling is a popular fishing technique. Trolling involves trailing a baited line and hook behind a slowly moving fishing boat. The slow motion of the boat causes the trolled bait to simulate the movement of a slow swimming prey, making the bait attractive to predator fish. Ideally, the predator fish will strike (attempt to bite) the bait in anticipation of obtaining an easy meal and will become hooked.

A fisherman can increase the number of strikes by trolling multiple lines from the boat simultaneously. When trolling with multiple lines, it is desirable to keep the lines spatially separated behind the boat to cover a larger potential fishing area and to prevent a line from becoming entangled with one or more of the other lines.

Outriggers are commonly used to provide the desired spatial separation between trolling lines. An outrigger uses a pole extended outboard of the fishing vessel. Outrigger poles of between ten and thirty feet are typical. A trolling line is extended from the end of the outrigger pole. The outrigger is mounted to the fishing vessel or boat to provide a stable point for positioning the pole. Angles near 90°, measured horizontally from the stern, provide the maximum separation distance from the boat for a trolled line. Outriggers mounted on separate sides of the boat and rigged outboard can provide trolling coverage over a wide area in the path behind the fishing vessel.

When trolling using the outrigger, it is desirable to hold the pole at an elevated angle so that the tip of the extended, flexible pole does not dip into the water.

The deployed position of the outrigger pole can present difficulties during navigation. The elevated pole position reduces the overall clearance to overhead obstacles, such as bridges. The extended poles require a wide clearance on each side of the boat. When navigating the fishing vessel in narrow waters, the required clearance around the boat may not be available. For these reasons it is desirable that the outrigger have the capability of rigging the outrigger pole to a stowed position inboard of the fishing vessel and with a lowered elevation of the outrigger pole to a near horizontal angle.

It is desirable that the positioning of the outrigger pole be performed from a safe and convenient location. For example, it is preferable that repositioning the outrigger not require leaning over the side of the boat because doing so might expose personnel to a risk of falling overboard.

The outrigger pole may experience a number of forces. The movement of the vessel produces a wind drag exerting a force on the outrigger pole that is largest when the outrigger pole is in the fully deployed position. The trolling line exerts a force on the pole, both from drag on the line and bait produced by movement through the water and from the force exerted by a caught fish striking and attempting to swim away with the bait. It is desirable that an outrigger firmly maintain the position of the trolling pole in both the stowed and the deployed condition so that the pole does not swing about, thus presenting a hazard to personnel aboard the vessel. For the same reason, the position of the outrigger pole should be maintained under positive control while the outrigger pole is being repositioned.

Japanese Patent No. 7-67,502 describes an automated fishing device. FIG. 1 of the document depicts a motor operated device employing a gear system for positioning fishing equipment. Japanese Patent No. 2003-125,688 describes a holding gear for mounting fishing gear to a boat. As shown in FIGS. 1 and 2 of the reference, the described invention contains a plurality of pivot points allowing a fishing gear to be position in various orientations relative to a fixed base.

Thus, a manually adjustable outrigger solving the aforementioned problems is desired.

SUMMARY OF THE INVENTION

An adjustable outrigger is a device for positioning a trolling pole outboard of a fishing vessel to deploy the pole for fishing and for rigging the trolling pole to a lowered and inboard position when not in use.

A preferred embodiment, the outrigger includes a base that supports the other components of the outrigger and that provides for mounting the outrigger to a position on a fishing boat.

In a preferred embodiment, the outrigger is operated using an operating handle. Rotating the operating handle in one direction rotates a pole held by the outrigger from an inboard position to the outboard, deployed position. Simultaneously with the rotation in the horizontal plane, the pole is elevated in the vertical plane from a near horizontal position to a suitable angle for trolling. Rotating the operating handle in the opposite direction returns the trolling pole to the stowed position. For example, in one embodiment the vertical angle when the fishing pole is inboard is 4°, with the pole being elevated to 32° when fully deployed.

The operating handle turns a shaft that communicates the rotation of the handle to an internal drive mechanism housed within a drive mechanism housing. The drive mechanism is a gearing system that receives the rotation from the handle and converts the handle motion into the rotation of a vertical drive shaft within the drive mechanism housing.

A second gearing system converts the rotation of the vertical drive shaft into a vertical motion. The second gearing system includes a ball gear comprising a ball screw and a concentric ball nut that is threaded onto the ball screw. The ball screw is rotated by the drive shaft. The ball nut is attached to a piston that constrains the rotation of the ball nut so that the ball nut moves vertically on the ball screw as the ball screw rotates on a vertical axis. The motion of the ball nut moves the piston up and down, depending on the direction of rotation of the operating handle.

A bayonet coupler concentric with the piston causes the piston to rotate as it moves vertically within the coupler. The coupler is provided with a parallel pair of inclined tracks cut into the cylindrical face of the coupler. Guide pins attached to bottom of the piston ride in the tracks of the bayonet coupler, causing the piston to rotate about its vertical axis as it moves upwards.

A linkage is pivotally attached to the top of the piston, and a receiver adapted for holding a trolling pole is attached to the top of the linkage. As the piston moves upwards, the piston increases the angle of inclination of the linkage and of the fishing pole receiver. Simultaneously with the change of inclination, as the piston rotates, the trolling pole receiver is rotated in a horizontal plane towards the outboard position. When the piston moves downwards, the inclination of the trolling pole is reduced towards a nearly horizontal position, and the trolling pole is rotated towards an inboard position.

These and other features of the present invention will become readily apparent upon further review of the following specification and drawings.

BRIEF DESCRIPTION OF THE DRAWINGS

FIG. 1C is an environmental side view of a fishing vessel with the outrigger rigged in.

Similar reference characters denote corresponding features consistently throughout the attached drawings.

DETAILED DESCRIPTION OF A PREFERRED EMBODIMENT

Figure 1A:
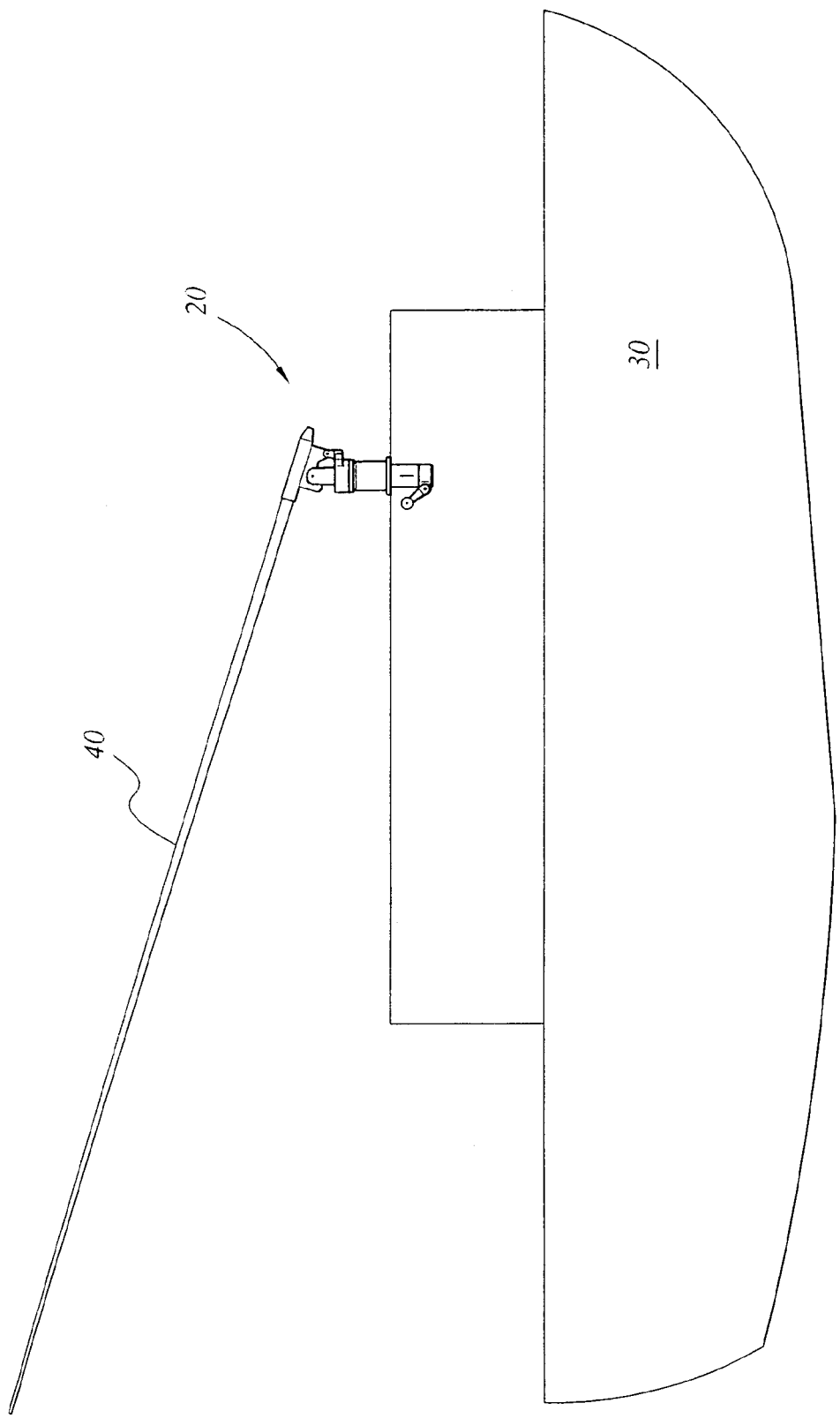
FIG. 1A is an environmental view of a preferred embodiment of an adjustable outrigger according to the present invention installed on a fishing boat.
Figure 1B:
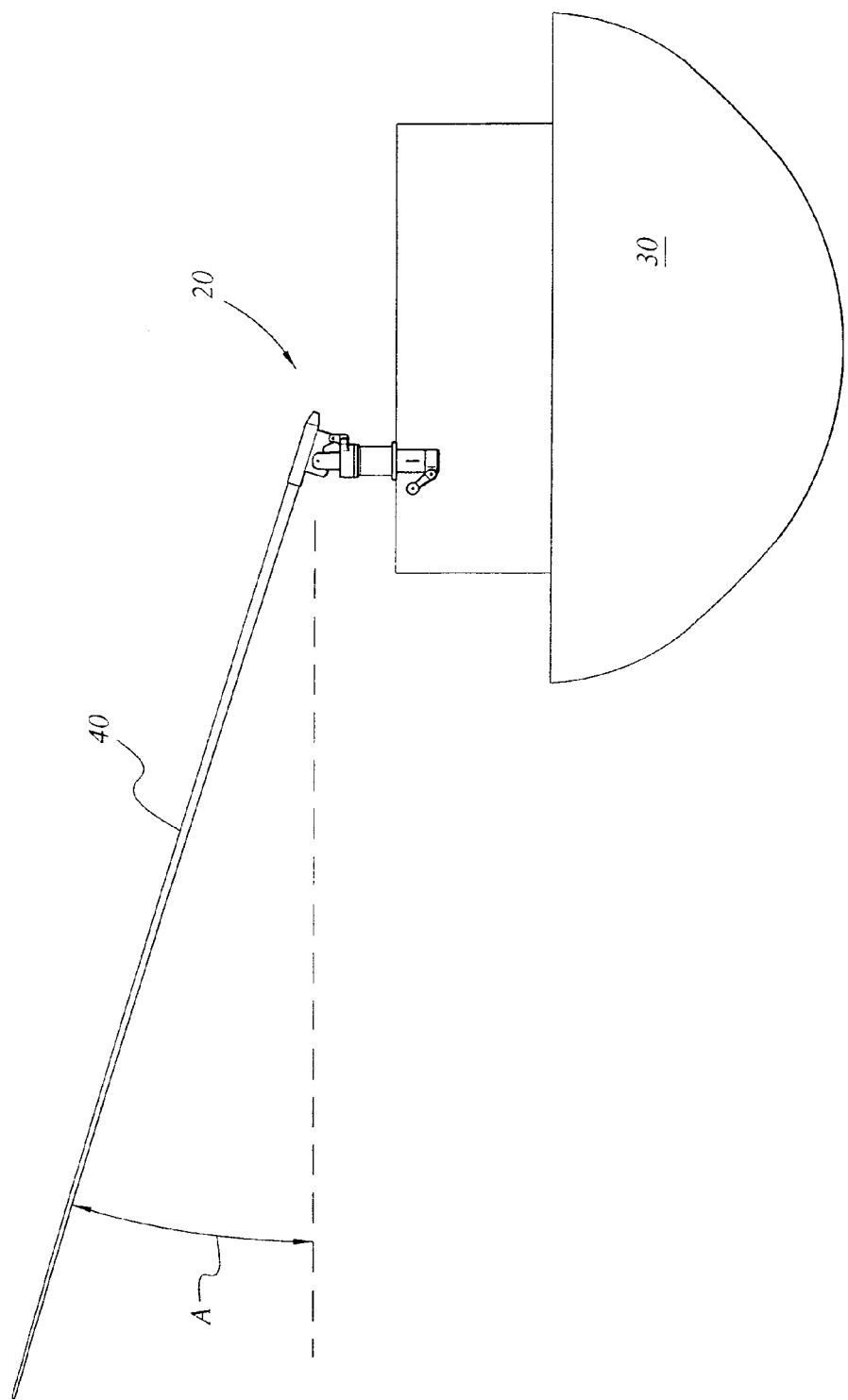
FIG. 1B is an environmental front view of a fishing vessel with the outrigger deployed.
Figure 1C:
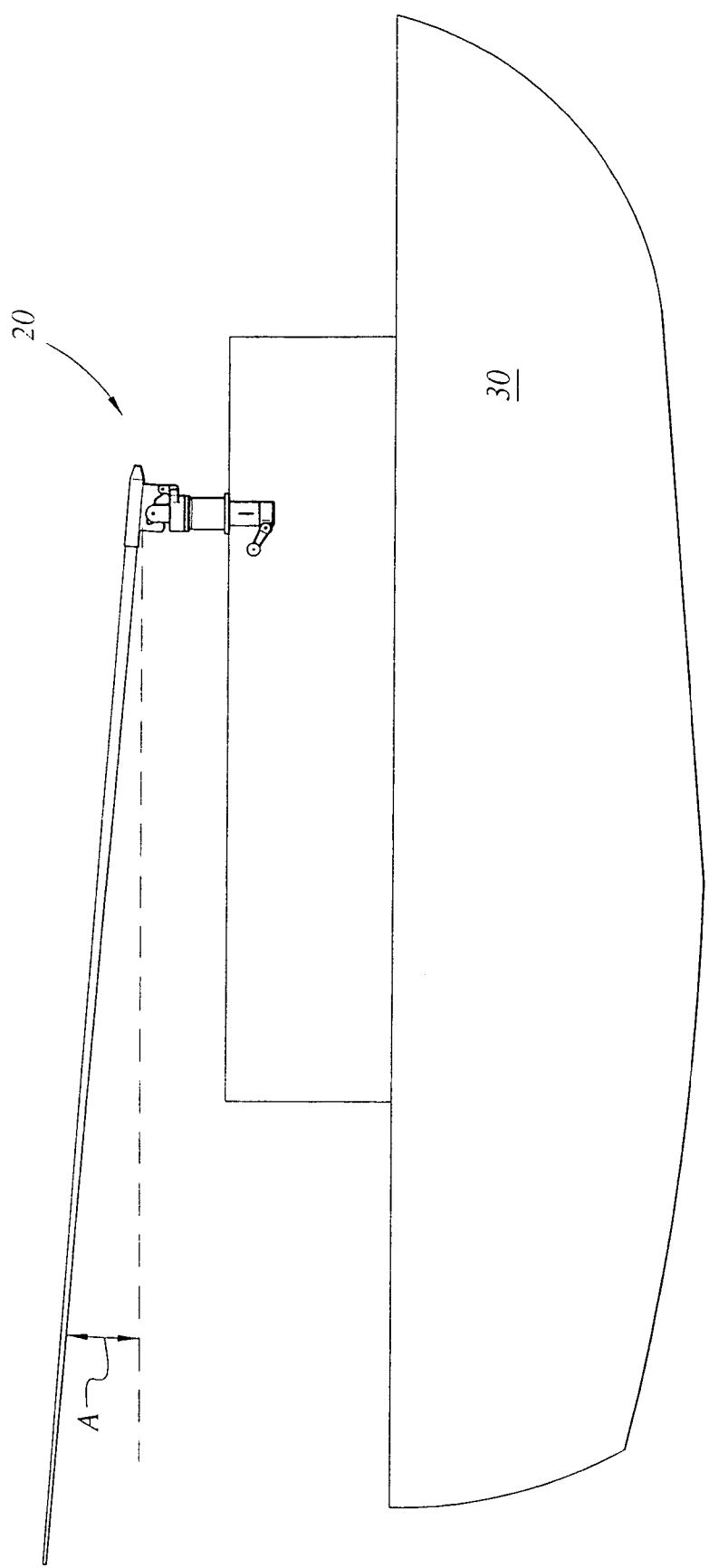

A preferred embodiment of an adjustable outrigger 20, namely, a manually adjustable embodiment, is shown attached to a fishing boat in FIGS. 1A-1C. The outrigger 20 is mounted to the top of the fishing boat 30. The outrigger 20 holds a trolling pole 40. By rotating the outrigger 20, the pole 40 may be rotated into the desired position. FIGS. 1A and 1B show the outrigger 20 holding the pole 40. FIG. 1B shows the outrigger 20 holding pole 40 in a deployed position. In the deployed position, the pole 40 is elevated at a relatively high angle, and the trolling pole 40 is positioned outboard of the boat 30. In FIG. 1C, the outrigger 20 holds the trolling pole 40 in a stowed position inboard of the boat 30. The elevation angle of the pole 40 is reduced to a more nearly horizontal position, providing a more compact arrangement of the pole 40 when not in use. By rotating the operating handle 62 (see FIG. 2) of the outrigger 20, the pole 40 may be moved from the deployed position to the stowed position from a convenient location within the boat 30.

Figure 2:
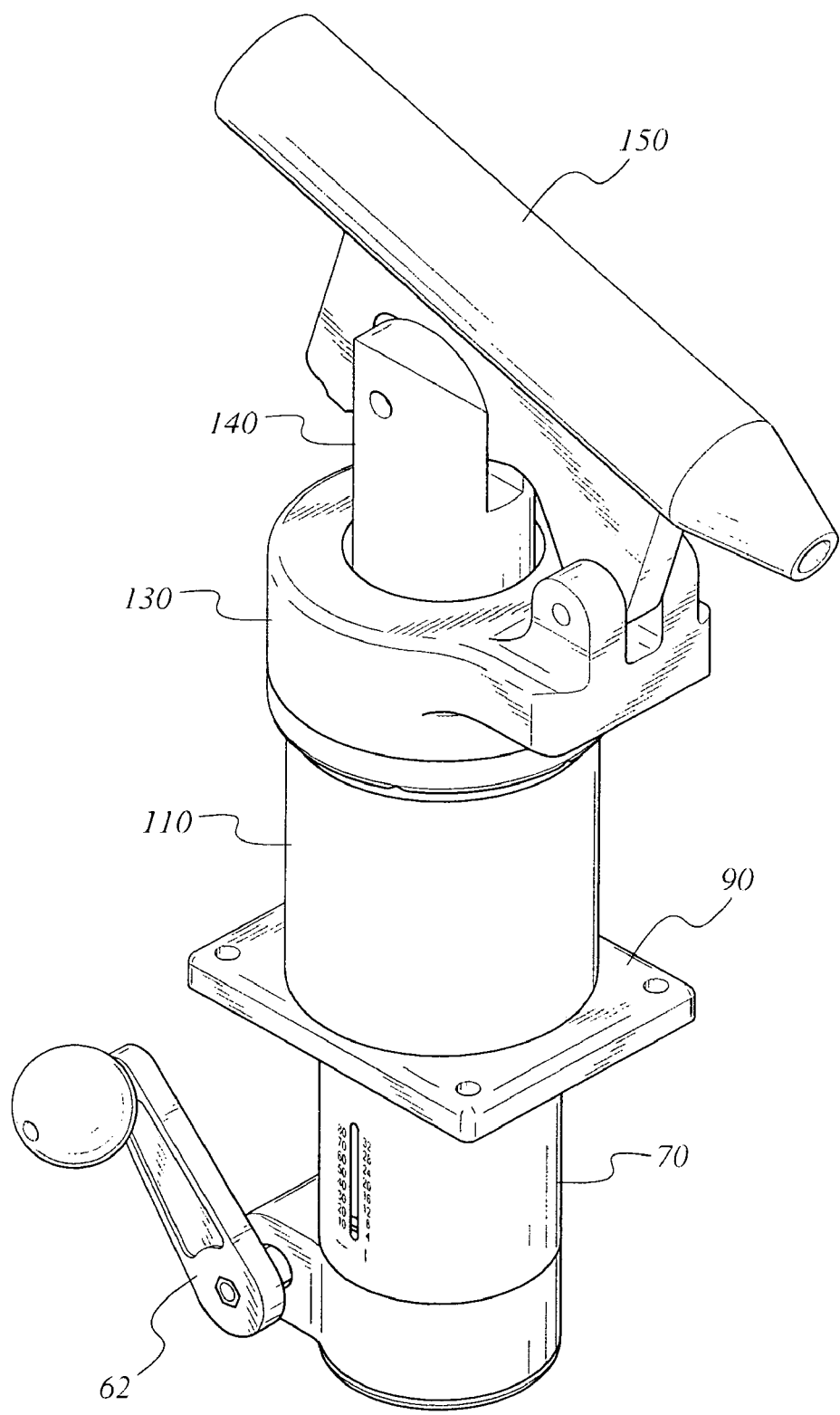
FIG. 2 is a front perspective view of a preferred embodiment of an adjustable outrigger according to the present invention.

The operation of the adjustable outrigger 20 may be understood by referring to FIG. 2. The adjustable outrigger 20 includes an operating handle 62. The operating handle 62 may be rotated in a vertical plane. A system of gears, described below, transmits the rotation of the handle 62 into the actions required to deploy or stow a pole held by the outrigger 20. The outrigger 20 further comprises an underbody 70, which contains drive gear components, a base plate 90 for mounting the outrigger 20 to a boat, a body 110 that houses additional gearing components, and a rotating piston 140 that rotates in the horizontal plane to position the fishing gear inboard or outboard of a fishing vessel while simultaneously moving up or down to elevate or lower the fishing gear. The outrigger 20 further comprises a cap assembly 130 concentric with the piston 140. The cap assembly 130 rotates freely around the piston 140. A linkage pivotally attached to the cap assembly 130 and to the piston 140 supports the fishing gear receiver 150. The fishing gear being deployed by the outrigger is held in the receiver 150. As the piston 140 is moved up or down within the outrigger body 110, the linkage rotates around the pivot points of the cap assembly 130 and the piston 140 to elevate or lower the receiver 150 and the fishing gear held by the receiver 150.

Figure 3:
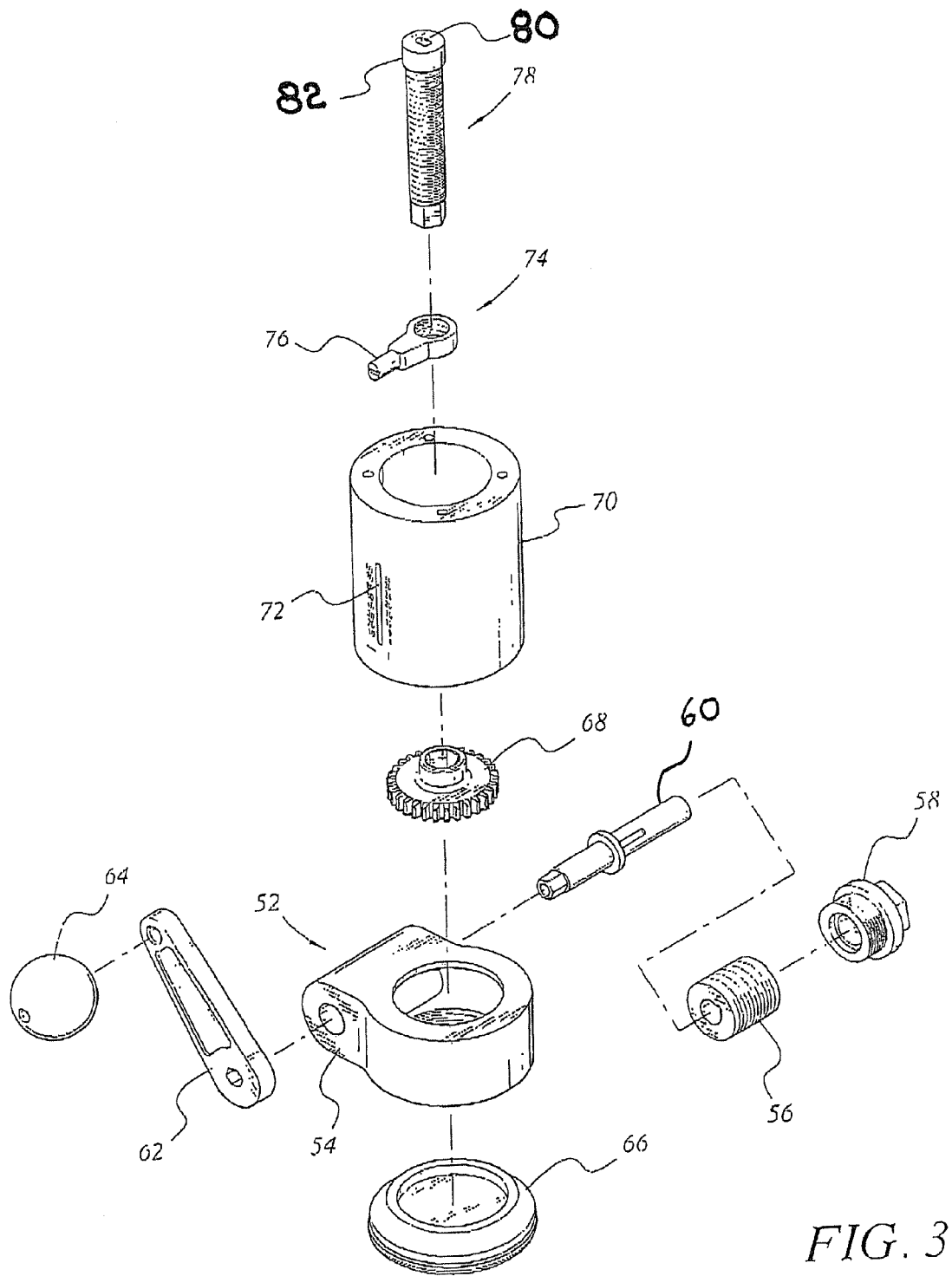
FIG. 3 is an exploded perspective view of the underbody assembly of a preferred embodiment of an adjustable outrigger of the present invention.

By referring to FIGS. 2 and 3, details of the lower portion of the outrigger 20 may be understood. The outrigger handle 62 is attached to a cylindrical drive shaft 60. A knob 64 attached to the free end of the operating handle 62 provides a purchase point for an operator turning the operating handle 62. The drive shaft 60 is rotatably journaled at one side of a cylindrically shaped gear housing 52. Concentrically fixed to the drive shaft 60 is a worm 56 of a worm and worm gear pair. Rotating the handle 62 in a vertical plane rotates the worm 56 within the journal 54 of the gear housing 52. The gear housing 52 defines a vertical cylindrical cavity, which communicates with the journal 54 holding the drive shaft 60 and worm 56. A worm gear 68 is supported within the cavity formed by bottom cap 66 and the gear housing 52. The bottom cap 66 closes off the bottom of the gear housing cavity. The worm 56 drives the worm gear 68 so that the rotation of the handle 62 results in the worm gear 68 rotating within the gear housing around the vertical axis.

A cylindrical underbody 70 is attached to the top of the gear housing 52. The underbody 70 defines an internal vertical cylindrical cavity. A vertical threaded shaft 78 is located concentrically within the cavity of the underbody 70. The lower end of the vertical shaft 78 is provided with a hexagonal key, which mates with a hexagonal opening on top of a concentric hub on the worm gear 68. A disc shaped position indicator 74 is threaded onto the vertical shaft 78. The periphery of the indicator 74 is provided with a tab 76, which slidably engages a vertical slot 72 on the underbody 70. When the worm gear 68 rotates the vertical shaft 78, the position indicator 74 moves vertically up and down, moving the indicator tab 76 vertically within the slot 74 on the under body 70. The position of the indicator tab 76 is registered against scales printed on opposite sides of the indicator slot 72 to indicate the horizontal position and vertical elevation of the fishing gear held by the outrigger 20. The top of the vertical shaft 78 is provided with a disk shaped shaft head 82.

Figure 4:
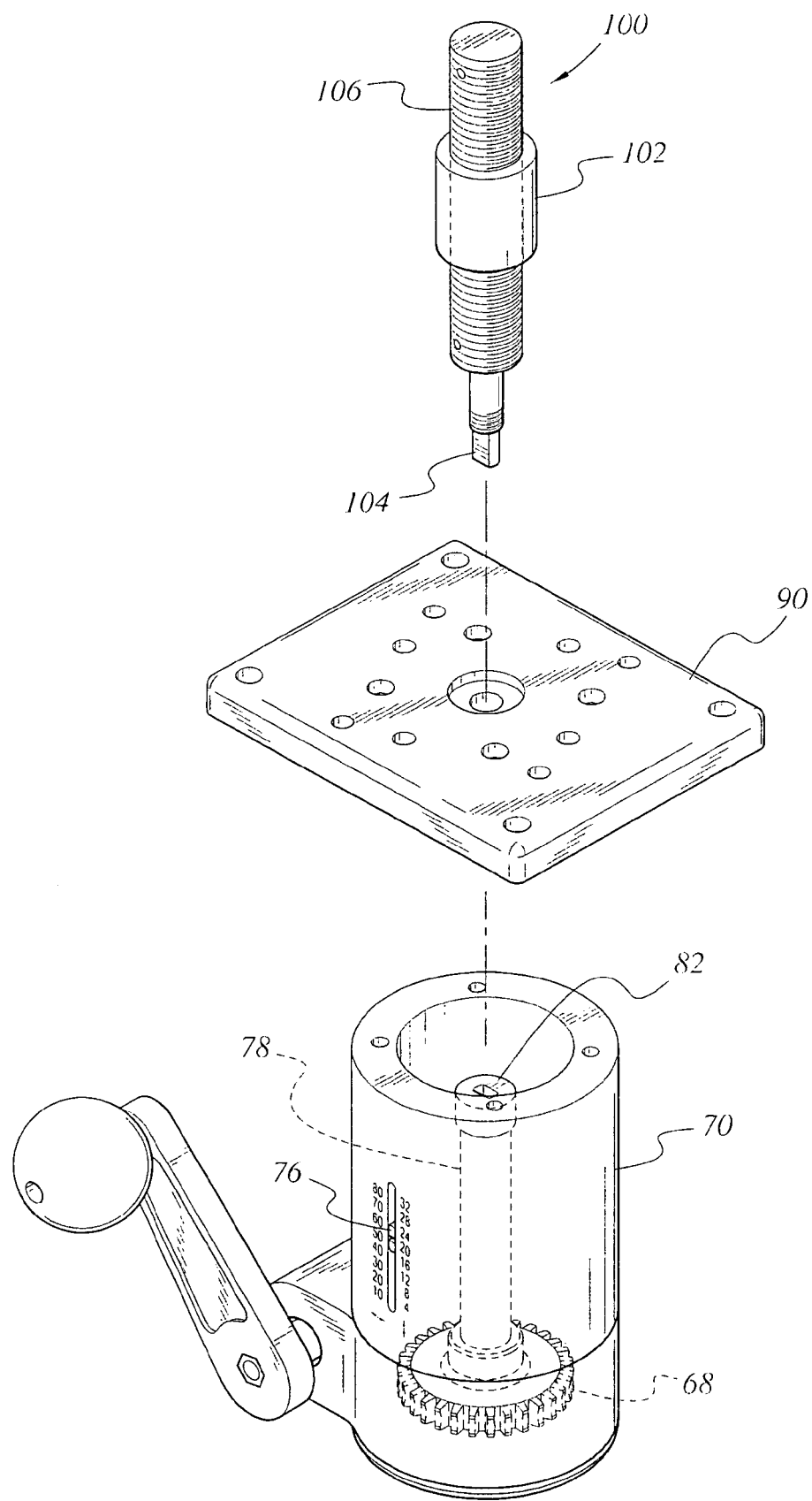
FIG. 4 is an exploded perspective view of the underbody assembly of a preferred embodiment of an adjustable outrigger of the present invention with the ball gear and the support plate.

Referring now to FIG. 4, further details of the manual outrigger 20 may be appreciated. The underbody 70 is mounted to the lower surface of a flat base plate 90. The base plate 90 is provided with holes for mounting the outrigger 20 to a fishing boat. The center of the base plate 90 has a circular opening centered over the vertical shaft cap 82. A ball gear assembly 100 is provided. The ball gear assembly 100 comprises a threaded ball screw 106, and a ball screw nut 102 that threadably engages the ball screw 106. The lower end of the ball screw 106 forms a tab 104 of an elongated horizontal cross section. The ball screw tab 104 extends through the central circular opening of the base plate 90 and engages a slot 80 in the cap head 82 of the vertical shaft 78 so that the rotation of the vertical shaft 78 is transmitted to the ball screw 106.

Figure 5:
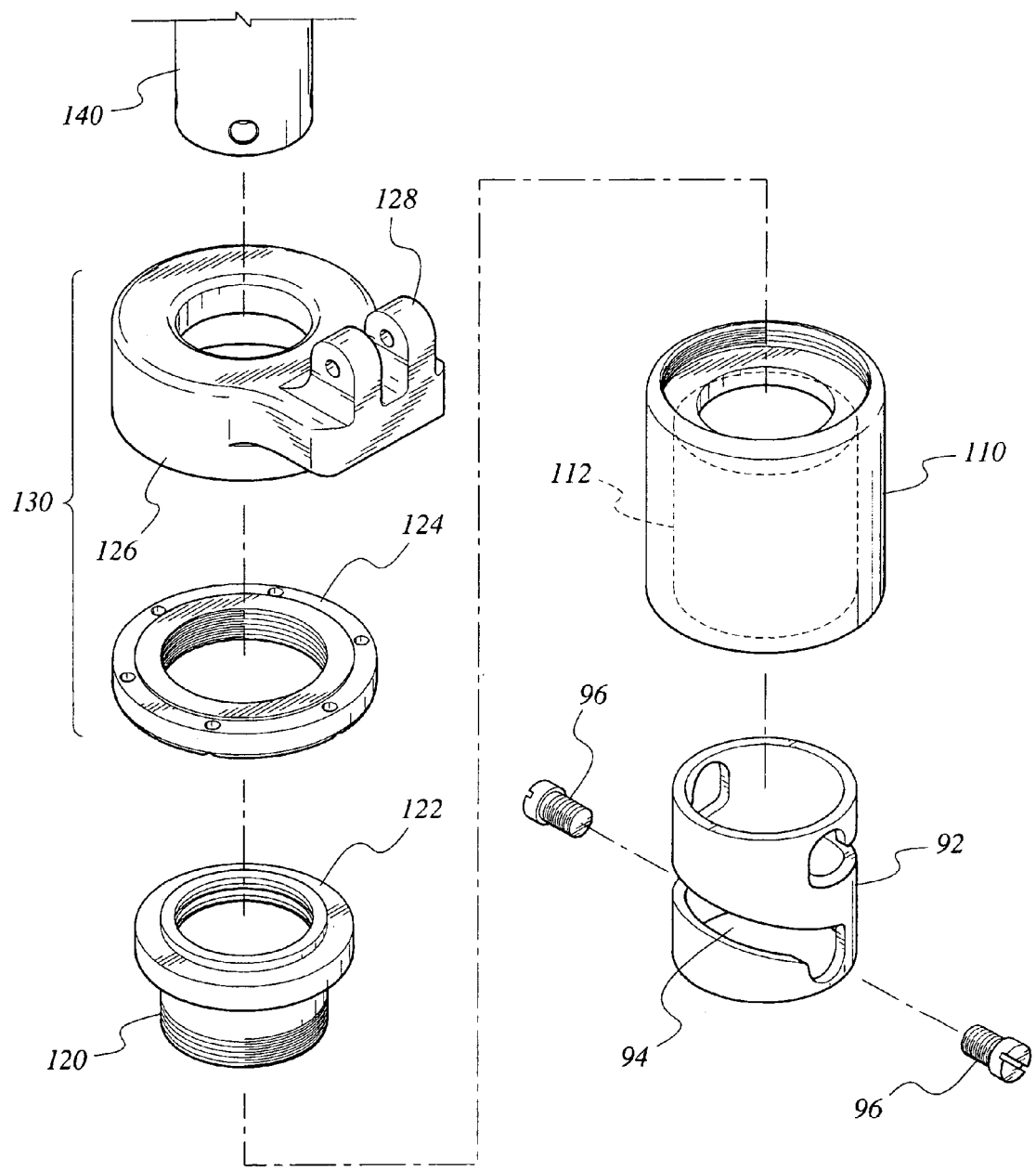
FIG. 5 is an exploded perspective view of body and upper cap assemblies of a preferred embodiment of an adjustable outrigger of the present invention.
Figure 6:
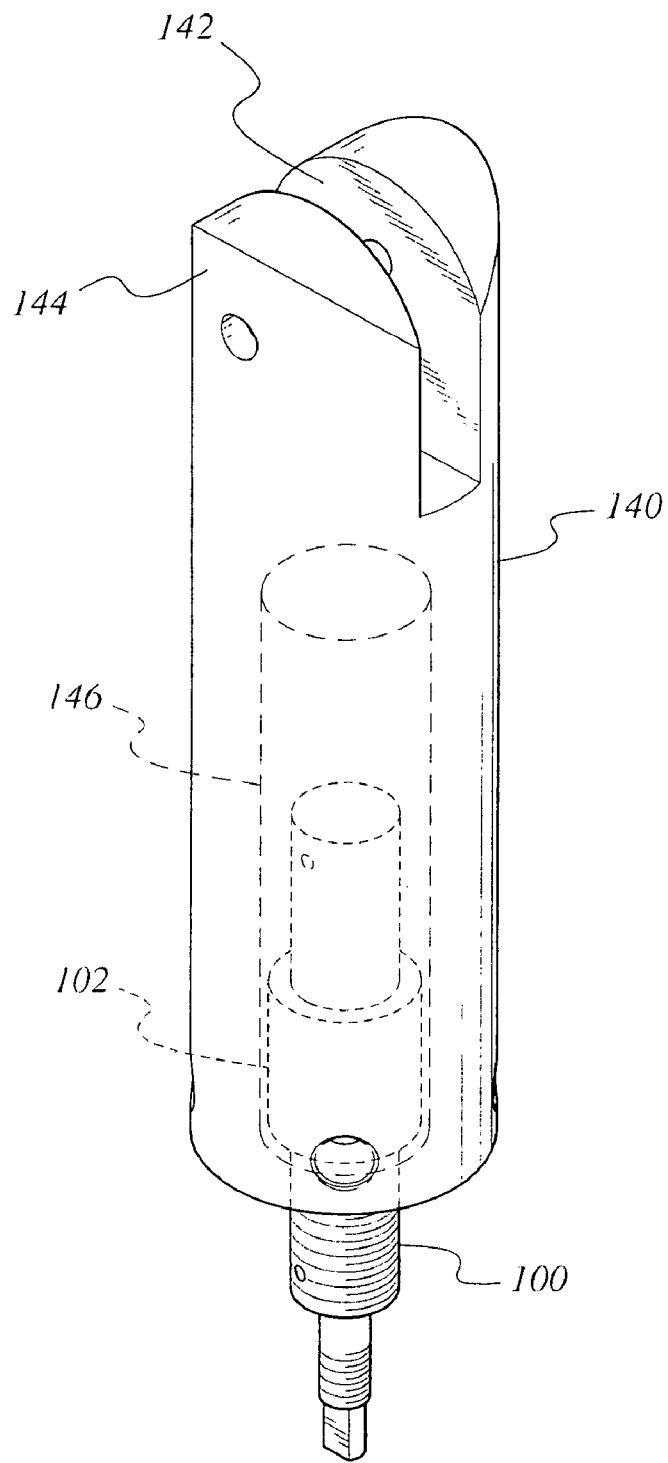
FIG. 6 is a perspective view of the piston and ball screw assembly of a preferred embodiment of an adjustable outrigger of the present invention.
Figure 7:
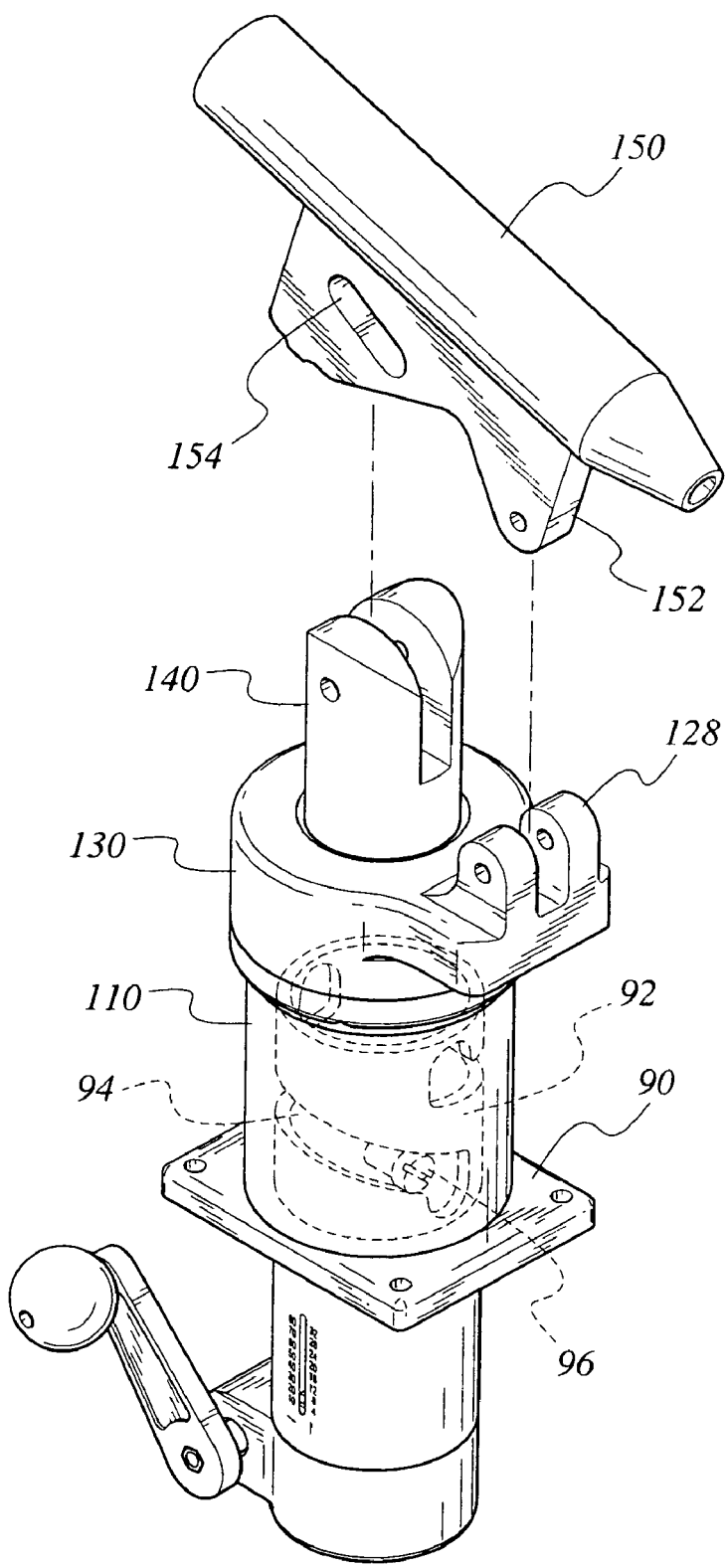
FIG. 7 is a perspective view showing the bayonet coupling, piston, and receiver assemblies of a preferred embodiment of an adjustable outrigger of the present invention.

Referring now to FIGS. 5, 6, and 7, further details of the operating mechanism for the manually adjustable outrigger 20 may be understood. The outrigger 20 further comprises an upper body 110. The upper body 110 is attached to the upper surface of the base plate 90. The upper body 110 is a hollow cylinder. The lower portion of the interior of the upper body 110 is a cavity 112 that rotatably journals a bayonet coupling 92. The bayonet coupling 92 is a hollow, vertical cylinder. A pair of parallel spiral or helical tracks 94 is cut into the surface of the coupling 92. The lower end of the piston 140 slidably engages the bayonet coupling 92. A pair of guide pins 96 thread into the lower portion of the piston 140 on opposite sides of the coupling 92. At the upper and lower ends of each track 94 are vertical detents. The heads of each guide pin 96 slidably engage one of the tracks 94 so that sliding the piston 140 vertically within the coupling 92 causes the guide pins 96 to move up or down the incline of the tracks 94, rotating the piston within the coupling 92. When the guide pins 96 are at the upper or lowermost ends of the tracks 94, the guide pins 96 engage the corresponding vertical detents. Engaging the detent locks the mechanism in place so that external forces applied to a fishing pole held by the outrigger 20 do not displace the outrigger from the fully deployed or fully rigged in position. Engaging the guide pins 96 in the detents also prevents external forces from being transmitted into the gear train, which would cause wear on the drive mechanism components of the outrigger.

The slope of the tracks 94 of the bayonet coupler 92 determines the correlation between the horizontal motion and the vertical motion of the piston 140 and, thus, the trolling pole. In a typical installation, a pair of outriggers 20 are mounted on opposite sides of a fishing vessel. The outrigger 20 on the port side of the vessel is constructed to elevate as the trolling pole 40 is rotated in a counterclockwise direction, while the outrigger 20 on the starboard side of the vessel would be constructed to elevate as the trolling pole 40 is rotated in a clockwise direction. These opposing travel senses are achieved by having the tracks 94 on the port side outrigger 20 defined with an incline that rises in a counterclockwise direction around the circumference of its coupler 92, while the tracks 94 of the coupler 92 on the starboard side outrigger 20 rise in a clockwise direction around the circumference of the respective coupler 92.

A concentric cavity 146 within the piston 140 slidably engages the screw of the ball screw 106, allowing the piston 140 to move up and down over the central axis of the screw 106. A lower portion of the piston cavity 146 holds the ball screw nut 102. Set screws threaded into the piston cavity 146 engage the ball screw nut 102 so that it cannot rotate within the cavity. As the ball screw 106 is rotated by the drive shaft 60, the ball screw nut 102 moves vertically up and down the screw 106 of the ball gear assembly 100, resulting in a corresponding vertical motion of the piston 140 within the upper body 110 of the outrigger 20.

A cap seat coupling 120 provides a reduced friction surface for the upper rotating components of the manually adjustable outrigger. The lower portion of the cap seat coupling 120 threads into the top of the upper body 110. The upper portion of the cap seat coupling 120 is provided with a smooth annular ring. The ring provides a seat 122 for the cap assembly 130 described below, allowing the cap assembly 130 to rotate freely about a vertical axis.

The cap assembly 130 comprises a cap base 124, and the cap head 126. The cap base 124 is a hollow cylinder. The lower surface of the cap base 124 provides a smooth surface, which seats against the cap seat 122 allowing the cap assembly 130 to rotate around the piston 140. The cap head 126 is also a hollow cylinder concentric with the piston 140. The lower rim of the cap head 126 is attached to the upper rim of the cap base 124. The upper surface of the cap head 126 is provided with lugs 128 for pivotally attaching a linkage 152 so that the linkage 152 can pivot in a vertical plane.

At the end of the linkage 152 opposite that pivotally attached to the cap head 126, the linkage 152 is pivotally attached to the piston 140 at a slot 154 defined in the linkage. A vertical slot 142 at the upper portion of the piston 140 forms a clevis 144. An pin extending through the clevis 144 slidably and pivotally engages the linkage slot 152 slot. When the piston 140 is moved up and down by the gearing mechanism, the linkage 152 pivots at the cap head and piston pivot points, varying the inclination angle of the linkage 152. A fishing pole receiver 150 is attached to the top of the linkage so that the inclination angle, also referred to as the elevation angle, of the receiver 150 is the same as that of the linkage. The fishing pole receiver 150 is a hollow cylinder, tapered at one end to allow the receiver to grip a fishing pole.

Summarizing the operation of the drive mechanism, when the operating handle is rotated, a worm and worm gear combination translates the handle motion into a rotation of an internal shaft. The rotation of the internal shaft is coupled to a ball gear. The ball gear moves the piston vertically up or down depending on the direction of rotation of the operating handle. A coupling causes the piston to rotate as the piston moves vertically up or down. The vertical motion and horizontal rotation of the piston is transmitted to a receiver holding a fishing pole allowing the fishing pole to be rigged out and elevated and rigged inboard and lowered as the operating handle is rotated. A pointer mechanism moves up or down on the internal shaft to indicate the vertical and horizontal position of the fishing pole.

The horizontal position of a trolling pole may be between 10° and 80°, as measured from the stern. The vertical inclination of the pole is controlled between 4° above horizontal in the stowed position to 32° above horizontal in the deployed position. These angular descriptions are provided by way of example and do not limit the invention to the described dimensions.

The gear drive mechanism comprises components that transfer the rotation of the operating handle to a vertical shaft within the outrigger. The described gear drive mechanism comprises a drive shaft with a concentric worm, and a worm gear, with the worm and worm gear combination transferring the rotation of the operating handle to a rotation of the vertical shaft around a vertical axis. The drive mechanism alternatively may be comprised of any gearing arrangement for transmitting the rotation of an operating handle to the rotation of the vertical shaft known in the art, including, but not limited to, arrangements of planetary gears, ring and pinion gears, or helical gears.

It is to be understood that the present invention is not limited to the embodiments described above, but encompasses any and all embodiments within the scope of the following claims.

I claim:

1. An adjustable fishing outrigger of the type used on a marine vessel for positioning an outrigger pole, said outrigger comprising:

a body adapted to be mounted in fixed relation to the marine vessel;

a receiver adapted for holding the outrigger pole, said receiver being coupled to said body in a manner allowing relative movement between said body and said receiver with respect to both (i) an angle of rotation of the outrigger pole about an axis, and (ii) an elevation angle of the outrigger pole;

a rotatably drivable motion conversion mechanism for converting rotational motion to linear motion, said motion conversion mechanism including a rotatably driven member and a linearly movable member coupled to said rotatably driven member for moving said linearly movable member in response to rotation of said rotatably driven member;

a track pitched in a direction along said axis; and a linearly and rotatably movable member coupled to both said linearly movable member of said motion conversion mechanism and to said track for effecting linear movement of said linearly and rotatably movable member along said axis for effecting rotation of said linearly and rotatably movable member about said axis, said linearly and rotatably movable member being coupled to said receiver for mechanically driving said receiver for adjusting both said elevation angle of the outrigger pole and said angle of rotation of the outrigger pole.

2. The outrigger of claim 1 wherein said motion conversion mechanism comprises a ball gear mechanism.

3. The outrigger of claim 2 wherein said rotatable driven member of said motion conversion mechanism comprises a ball screw and said linearly movable member of said motion conversion mechanism comprises a ball nut.

4. The outrigger of claim 1 further comprising a driving device coupled to said motion conversion mechanism for driving said rotatably drivable motion conversion mechanism.

5. The outrigger of claim 4 wherein said driving device comprises a manually powered driving device.

6. The outrigger of claim 4 further comprising a drive mechanism coupled to said driving device, said drive mechanism including a plurality of gears mechanically interposed between said driving device and said motion conversion mechanism.

7. The outrigger of claim 4 wherein said driving device comprises a rotatably reversible driving device.

8. The outrigger of claim 1 wherein said linearly and rotatably movable member comprises a piston.

9. The outrigger of claim 1 wherein said elevation angle of the outrigger pole and said angle of rotation of the outrigger pole are adjusted simultaneously.

10. The outrigger of claim 1 wherein there is a correlation between said elevation angle of the outrigger pole and said angle of rotation of the outrigger pole.

11. The outrigger of claim 1 wherein said elevation angle of the outrigger pole and said angle of rotation of the outrigger pole are adjusted simultaneously and wherein there is a correlation between said elevation angle of the outrigger pole and said angle of rotation of the outrigger pole.

12. The outrigger of claim 1 further comprising a visual indicator of a position of the outrigger pole, said visual indicator including a scale which provides a quantitative indication of said position.

13. The outrigger of claim 12 wherein said visual indicator indicates said position with respect to both said elevation angle of the outrigger pole and said angle of rotation of the outrigger pole.

14. The outrigger of claim 13 wherein said visual indicator comprises a mechanical indicator.

15. The outrigger of claim 14 wherein said mechanical indicator includes a tab mechanically coupled to said linearly movable member of said motion conversion mechanism and a scale having position indicating indicia, said position of the outrigger pole being indicated by a location of said tab with respect to said scale.

16. An adjustable fishing outrigger for use on a marine vessel for positioning an outrigger pole, said outrigger comprising:

a receiver adapted for holding the outrigger pole, said receiver being mounted to allow relative movement between said vessel and said receiver with respect to both (i) an angle of rotation of the outrigger pole about an axis, and (ii) an elevation angle of the outrigger pole;

a rotatable driving device;

a ball gear mechanism including a rotatable screw, said screw being coupled to said driving device to effect rotation of said screw in response to rotation of said driving device, said ball gear mechanism further including a ball nut coupled to said screw to effect linear movement of said ball nut in response to said rotation of said screw;

a track pitched in a direction along said axis; and a member coupled to said ball nut for effecting linear movement of said member along said axis in response to said linear movement of said ball nut, said member also being coupled to said track for effecting rotation of said member about said axis in response to linear movement of said ball nut, said member further being coupled to said receiver for driving said receiver to effect both (i) adjustment of said elevation angle of the outrigger pole and (ii) adjustment of said angle of rotation of the outrigger pole.

17. The outrigger of claim 16 wherein said driving device is a manually powered driving device.

18. The outrigger of claim 16 wherein said driving device comprises a rotatably reversible driving device operable to cause (i) reversible rotation of said rotatable screw, and (ii) reversible linear movement of said ball nut and (iii) reversible rotational movement of said member, whereby said elevation angle of the outrigger pole and said angle of rotation of the outrigger pole are both adjustable reversibly.

19. The outrigger of claim 16 further comprising a drive mechanism mechanically coupled to said driving device, said drive mechanism being a geared drive mechanism.

20. The outrigger of claim 16 wherein said driving device comprises a manually powered hand crank.

21. The outrigger of claim 16 further comprising a drive mechanism mechanically coupled to said driving device, said drive mechanism including a plurality of gears mechanically interposed between said driving device and said ball gear mechanism.

22. The outrigger of claim 16 wherein said elevation angle of the outrigger pole and said angle of rotation of the outrigger pole are adjusted simultaneously.

23. The outrigger of claim 16 wherein there is a correlation between said elevation angle of the outrigger pole and said angle of rotation of the outrigger pole.

24. The outrigger of claim 16 wherein said elevation angle of the outrigger pole and said angle of rotation of the outrigger pole are adjusted simultaneously and wherein there is a correlation between said elevation angle of the outrigger pole and said angle of rotation of the outrigger pole.

25. The outrigger of claim 16 further comprising a visual indicator of a position of the outrigger pole, said visual indicator including a scale which provides a quantitative indication of said position.

26. The outrigger of claim 25 wherein said visual indicator indicates said position with respect to both said elevation angle of the outrigger pole and said angle of rotation of the outrigger pole.

27. An adjustable fishing outrigger for use on a marine vessel for positioning an outrigger pole, said outrigger comprising:
a receiver adapted for holding the outrigger pole, said receiver being mounted to allow relative movement between said vessel and said receiver with respect to both (i) an angle of rotation of the outrigger pole about an axis, and (ii) an elevation angle of the outrigger pole;
a rotatable driving device;
a ball gear mechanism including a rotatable screw, said screw being mechanically coupled to said driving device to effect rotation of said screw in response to rotation of said driving device, said ball gear mechanism further including a ball nut mechanically coupled to said screw to effect linear movement of said ball nut in response to said rotation of said screw,
a track pitched in a direction along said axis; and
a member coupled to said ball nut for effecting linear movement of said member, said member also being coupled to said track, said member being linearly movable along said axis in response to said linear movement of said ball nut for effecting rotation of said member about said axis in response to said linear movement of said ball nut, said member further being coupled to said receiver for driving said receiver to effect both (i) adjustment of said elevation angle of the outrigger pole and (ii) adjustment of said angle of rotation of the outrigger pole.

28. The outrigger of claim 27 wherein said driving device is a manually powered driving device.

29. The outrigger of claim 28 wherein said driving device comprises a rotatably reversible driving device.

30. The outrigger of claim 28 further comprising a drive mechanism mechanically coupled to said driving device, said drive mechanism being a geared drive mechanism.

31. The outrigger of claim 30 wherein said rotatable screw of said ball gear mechanism is mechanically coupled to said driving device by way of said drive mechanism.

32. The outrigger of claim 28 wherein said adjustment of said elevation angle of the outrigger pole and said adjustment of said angle of rotation of the outrigger pole occur simultaneously.

33. The outrigger of claim 28 wherein there is a correlation between said elevation angle of the outrigger pole and said angle of rotation of the outrigger pole.

34. The outrigger of claim 28 wherein said adjustment of said elevation angle of the outrigger pole and said adjustment of said angle of rotation of the outrigger pole occur simultaneously and wherein there is a correlation between said elevation angle of the outrigger pole and said angle of rotation of the outrigger pole.

35. The outrigger of claim 34 further comprising a visual indicator of a position of the outrigger pole, said visual indicator including a scale which provides a quantitative indication of said position.

36. The outrigger of claim 35 wherein said visual indicator indicates said position with respect to both said elevation angle of the outrigger pole and said angle of rotation of the outrigger pole.

37. The outrigger of claim 35 wherein said visual indicator provides indicia indicating said correlation between said elevation angle of the outrigger pole and said angle of rotation of the outrigger pole.

38. The outrigger of claim 28 wherein said axis is a vertical axis.

39. The outrigger of claim 38 wherein said angle of rotation of the outrigger pole is an angle of rotation in a horizontal plane.

40. The outrigger of claim 28 wherein said angle of rotation of the outrigger pole is an angle of rotation in a horizontal plane.

41. The outrigger of claim 28 further comprising a body and a base plate coupled to said body, body being adapted to be mounted in said fixed relation to the vessel by way of said base plate.

42. The outrigger of claim 28 wherein said track is a spiral track.

43. The outrigger of claim 28 wherein said track comprises a helical track.

44. The outrigger of claim 43 wherein said track forms part of a coupling.

45. The outrigger of claim 44 wherein said coupling is a bayonet coupling provided with detents at opposed ends of said track.

46. The outrigger of claim 43 wherein said pitch of said track determines a correlation between said elevation angle of the outrigger pole and said angle of rotation of the outrigger pole.

47. The outrigger of claim 28 wherein said member is coupled to said ball gear mechanism comprises a piston.

48. The outrigger of claim 47 wherein said track comprises a helical track.

49. The outrigger of claim 28 wherein said member coupled to said ball gear mechanism comprises a piston which is coupled to said track which comprises an inclined track.

50. The outrigger of claim 49 wherein said track comprises a spiral track having a pitch along said axis.

51. The outrigger of claim 49 wherein said track comprises a helical track having a pitch along said axis.

52. The outrigger of claim 28 further comprising a cap, said cap being mechanically coupled to said receiver in a manner permitting rotation between said cap and said receiver.

53. The outrigger of claim 52 wherein said receiver is mechanically coupled to said cap by way of a pivotable linkage.

54. The outrigger of claim 53 wherein said receiver is mechanically coupled to said cap by way of said linkage so that said receiver is at an elevation angle which is the same as said elevation angle of the outrigger pole.

55. The outrigger of claim 27 wherein said rotatable driving device comprises a hand crank, said outrigger further comprising a drive mechanism coupled to said hand crank, said drive mechanism including a plurality of gears.

56. The outrigger of claim 55 wherein said rotatable screw of said ball gear mechanism is coupled to said hand crank way of said drive mechanism.

57. The outrigger of claim 27 wherein said adjustment of said elevation angle of the outrigger pole and said adjustment of said angle of rotation of the outrigger pole occur simultaneously.

58. The outrigger of claim 27 wherein there is a correlation between said elevation angle of the outrigger pole and said angle of rotation of the outrigger pole.

59. The outrigger of claim 58 further comprising a visual indicator of position of the outrigger pole, said visual indicator including a scale which provides a quantitative indication of said position.

60. The outrigger of claim 59 wherein said visual indicator indicates said position with respect to both said elevation angle of the outrigger pole and said angle of rotation of the outrigger pole.

61. The outrigger of claim 59 wherein said visual indicator provides an indication of said correlation between said elevation angle of the outrigger pole and said angle of rotation of the outrigger pole.

62. The outrigger of claim 27 wherein said adjustment of said elevation angle of the outrigger pole and said adjustment of said angle of rotation of the outrigger pole occur simultaneously and wherein there is a correlation between said elevation angle of the outrigger pole and said angle of rotation of the outrigger pole.

63. The outrigger of claim 27 wherein said axis is a vertical axis.

64. The outrigger of claim 63 wherein said angle of rotation of the outrigger pole is an angle of rotation in a horizontal plane.

65. The outrigger of claim 27 wherein said angle of rotation of the outrigger pole is an angle of rotation in a horizontal plane.

66. The outrigger of claim 27 further comprising a body and a base plate coupled to said body for mounting in said fixed relation to the marine vessel by way of said base plate.

67. The outrigger of claim 27 wherein said track comprises a spiral track.

68. The outrigger of claim 27 wherein said track comprises a helical track.

69. The outrigger of claim 27 wherein said track forms part of a coupling.

70. The outrigger of claim 69 wherein said coupling is a bayonet coupling provided with detents at opposed ends of said track.

71. The outrigger of claim 27 wherein said pitch of said track determines said correlation between said elevation angle of the outrigger pole and said angle of rotation of the outrigger pole.

72. The outrigger of claim 27 wherein said member mechanically coupled to said ball gear mechanism comprises a piston.

73. The outrigger of claim 72 wherein said track comprises a helical track.

74. The outrigger of claim 27 wherein said member coupled to said ball gear mechanism comprises a piston mechanically coupled to a track.

75. The outrigger of claim 74 wherein said track comprises a spiral track having a pitch along said axis.

76. The outrigger of claim 74 wherein said track comprises a helical track having a pitch along said axis.

77. The outrigger of claim 27 further comprising a cap, said receiver being mounted to allow rotation of said receiver relative to said cap.

78. The outrigger of claim 77 wherein said receiver is coupled to said cap by way of a pivotable linkage.

79. The outrigger of claim 78 wherein said receiver is mechanically coupled to said cap by way of said linkage so that said receiver is at an elevation angle which is the same as said elevation angle of the outrigger pole.

80. An adjustable fishing outrigger for use on a marine vessel for positioning an outrigger pole in either a rigged-in position or a deployed position, said outrigger comprising:
a body adapted to be mounted in fixed relation to the marine vessel;
a receiver adapted for holding the outrigger pole, said receiver being mechanically coupled to said body in a manner allowing relative movement between said body and said receiver with respect to both (i) an angle of rotation of the outrigger pole about an axis, and (ii) an elevation angle of the outrigger pole;
a reversibly rotatable driving device;
a ball gear mechanism including a rotatable screw, said screw being coupled to said driving device to effect reversible rotation of said screw in response to rotation of said driving device, said ball gear mechanism further including a ball nut coupled to said screw to effect reversible relative linear movement between said ball nut and said screw in response to said rotation of said screw;
a track pitched in a direction along said axis; and
a member coupled to said ball gear mechanism for effecting reversible linear movement of said member along said axis, said member also being coupled to said track for effecting reversible rotation of said member about said axis, said member further being coupled to said receiver for driving said receiver to effect both (i) reversible adjustment of said elevation angle of the outrigger pole and (ii) reversible adjustment of said angle of rotation of the outrigger pole, whereby the outrigger pole may be adjustably positioned in either a rigged-in position or a deployed position in response to rotation of said driving device.

81. The outrigger of claim 80 wherein said driving device comprises a manually powered driving device.

82. The outrigger of claim 81 wherein said driving device comprises a hand crank.

83. The outrigger of claim 80 her comprising a drive mechanism mechanically coupled to said driving device, said drive mechanism being a geared drive mechanism.

84. The outrigger of claim 83 wherein said reversibly rotatable driving device comprises a hand crank and wherein said rotatable screw of said ball gear mechanism is mechanically coupled to said hand crank by way of said drive mechanism.

85. The outrigger of claim 80 wherein said adjustment of said elevation angle of the outrigger pole and said adjustment of said angle of rotation of the outrigger pole are simultaneous.

86. The outrigger of claim 80 wherein there is a correlation between said elevation angle of the outrigger pole and said angle of rotation of the outrigger pole.

87. The outrigger of claim 80 wherein said elevation angle of the outrigger pole and said angle of rotation of the outrigger pole are adjusted simultaneously and wherein there is a correlation between said elevation angle of the outrigger pole and said angle of rotation of the outrigger pole.

88. The outrigger of claim 80 further comprising a visual indicator of a position of the outrigger pole, said visual indicator including a scale which provides a quantitative indication of said position.

89. The outrigger of claim 88 wherein said visual indicator indicates said position with respect to both said elevation angle of the outrigger pole and said angle of rotation of the outrigger pole.

90. The outrigger of claim 89 wherein said visual indicator provides indicia indicating said correlation between said elevation angle of the outrigger pole and said angle of rotation of the outrigger pole.

91. The outrigger of claim 80 wherein said axis is a vertical axis and said angle of rotation of the outrigger pole is an angle of rotation in a horizontal plane.

92. The outrigger of claim 80 further comprising a base plate mechanically coupled to said body and wherein said body is adapted to be mounted in said fixed relation to the marine vessel by way of said base plate.

93. The outrigger of claim 80 wherein said track is a spiral track.

94. The outrigger of claim 80 wherein said track comprises a helical track.

95. The outrigger of claim 80 wherein said track forms part of a coupling.

96. The outrigger of claim 95 wherein said coupling comprises a bayonet coupling provided with detents at opposed ends of said track.

97. The outrigger of claim 80 wherein said pitch of said track determines a correlation between said elevation angle of the outrigger pole and said angle of rotation of the outrigger pole.

98. The outrigger of claim 97 wherein said track comprises a helical track.

99. The outrigger of claim 80 wherein said member coupled to said ball gear mechanism comprises a piston.

100. The outrigger of claim 80 wherein said member coupled to said ball gear mechanism comprises a piston which is coupled to said track.

101. The outrigger of claim 100 wherein said track comprises a spiral track having said pitch along said axis.

102. The outrigger of claim 100 wherein said track comprises a helical track having said pitch along said axis.

103. The outrigger of claim 80 wherein said receiver is coupled to said body by way of a cap, said cap being freely rotatably mounted to said body to allow said relative movement between said body and said receiver with respect to said angle of rotation, said receiver being coupled to said cap by way of a pivotable linkage, said pivotable linkage allowing said relative movement between said body and said receiver with respect to said elevation angle.

104. An adjustable fishing outrigger of the type used on a marine vessel for positioning an outrigger pole, said outrigger comprising:
    a body for mounting the outrigger to the marine vessel;
    a rotatable driving device;
    a reversibly rotatable drive mechanism coupled to said driving device;
    a ball gear mechanism coupled to said drive mechanism, said ball gear mechanism including a reversibly rotatable screw, said screw being rotationally coupled to said drive mechanism to rotate in response to rotation of said drive mechanism, said ball gear mechanism further including a ball nut coupled to said screw so that rotation of said screw produces reversible linear movement of said ball nut;
    a track pitched in a direction along an axis;
    a member coupled to said ball nut, said member being mounted for reversible linear movement of said member along said axis in response to said reversible linear movement of said ball nut, said member also being coupled to said track and mounted for reversible rotation of said member about said axis in response to said reversible linear movement of said ball nut, and
    a receiver adapted for holding the outrigger pole at an elevation angle and at a rotational position in a plane perpendicular to said axis, said receiver being coupled to said member so that said linear movement of said member along said axis adjusts said elevation angle of the outrigger pole, and said rotation of said member about said axis rotates said receiver to adjust said rotational position of the outrigger pole in accordance with the pitch of said track.

105. The outrigger of claim 104 wherein said driving device is a manually powered driving device.

106. The outrigger of claim 105 wherein said elevation angle of the outrigger pole and said angle of rotation of the outrigger pole are adjusted simultaneously and wherein there is a correlation between said elevation angle of the outrigger pole and said angle of rotation of the outrigger pole.

107. The outrigger of claim 104 wherein said driving device comprises a manually powered hand crank.

108. The outrigger of claim 104 wherein said driving device comprises a rotatably reversible driving device operable to cause (i) reversible rotation of said rotatable screw, and (ii) reversible linear movement of said ball nut and (iii) reversible rotational movement of said member, whereby said elevation angle of the outrigger pole and said angle of rotation of the outrigger pole are both adjustable reversibly.

109. The outrigger of claim 104 further comprising a drive mechanism mechanically coupled to said driving device, said drive mechanism being a geared drive mechanism.

110. The outrigger of claim 104 further comprising a drive mechanism mechanically coupled to said driving device, said drive mechanism including a plurality of gears mechanically interposed between said driving device and said ball gear mechanism.

111. The outrigger of claim 104 wherein said elevation angle of the outrigger pole and said angle of rotation of the outrigger pole are adjusted simultaneously.

112. The outrigger of claim 104 wherein there is a correlation between said elevation angle of the outrigger pole and said angle of rotation of the outrigger pole.

113. The outrigger of claim 104 further comprising a visual indicator of a position of the outrigger pole, said visual indicator including a scale which provides a quantitative indication of said position.

114. The outrigger of claim 113 wherein said visual indicator indicates said position with respect to both said elevation angle of the outrigger pole and said angle of rotation of the outrigger pole.

115. The outrigger of claim 114 wherein said visual indicator is a mechanical device.

116. A manually adjustable outrigger for positioning a trolling pole, the outrigger comprising:
    a base plate adapted for mounting the outrigger to a supporting surface;
    a drive mechanism housing supported by the base plate;
    a drive shaft disposed within the drive mechanism housing;
    an operating handle;
    a drive mechanism translating rotation of the operating handle into rotation of the drive shaft;
    a ball gear mechanism including (i) a rotatable ball screw coupled to the drive shaft to rotate in response to rotation of the drive shaft and, (ii) a ball nut threadably coupled to the ball screw so that rotation of the ball screw produces bi-directional linear movement of the ball nut;
    a piston coupled to the ball nut for causing the piston to undergo a reciprocating motion along a vertical axis in response to the bi-directional linear movement of the ball nut;
    a track to which the piston is coupled for rotating the piston around the vertical axis as the piston moves linearly along the vertical axis as the piston undergoes the reciprocating motion; and
    a receiver adapted for holding an outrigger pole, the receiver being pivotally coupled to the piston so that linear movement of the piston along the vertical axis changes an elevation angle of the receiver, and rotation of the piston about the vertical axis rotates the receiver in a horizontal plane.

117. An outrigger apparatus, comprising a pair of outriggers, each of said outriggers comprising the outrigger as claimed in claim 116, said outriggers being internally geared such that rotation in a given rotational direction of each of the operating handles of each respective outrigger causes said receivers to rotate oppositely, outwardly of a boat upon which they are mounted.

118. The outrigger of claim 116, wherein said receiver is arranged to move in a vertical plane between about 4 degrees to about 32 degrees above the horizontal plane, and in a horizontal plane between about 10 degrees and 80 degrees measured with respect to a vertical plane parallel with a keel of a boat.

119. The outrigger of claim 116, further comprising an indicator tab and scales, for visually registering an angular height and horizontal displacement of a trolling pole held in said receiver.

120. The outrigger of claim 116, wherein said means for rotating the piston around the vertical axis comprises a bayonet coupler with a track being provided to convert linear vertical motion of said piston into combined, simultaneous vertical and horizontal receiver motion.

* * * * *